(12) United States Patent
Huang

(10) Patent No.: US 10,382,496 B2
(45) Date of Patent: Aug. 13, 2019

(54) METHOD, APPARATUS, AND COMPUTER-READABLE MEDIUM FOR VOICE CALL

(71) Applicant: Beijing Xiaomi Mobile Software Co., Ltd., Haidian District, Beijing (CN)

(72) Inventor: Qianhong Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 94 days.

(21) Appl. No.: 15/722,886

(22) Filed: Oct. 2, 2017

(65) Prior Publication Data

US 2018/0109568 A1 Apr. 19, 2018

(30) Foreign Application Priority Data

Oct. 14, 2016 (CN) .......................... 2016 1 0900116

(51) Int. Cl.
*H04L 29/06* (2006.01)
*H04M 1/2745* (2006.01)
(Continued)

(52) U.S. Cl.
CPC ...... *H04L 65/1069* (2013.01); *H04L 65/1016* (2013.01); *H04L 65/602* (2013.01);
(Continued)

(58) Field of Classification Search
CPC ............ H04M 1/2745; H04M 1/72519; H04L 65/1069; H04L 65/1016; H04L 65/602; H04L 67/24; H04L 67/141; H04L 67/36
(Continued)

(56) References Cited

U.S. PATENT DOCUMENTS

2004/0028071 A1* 2/2004 Gehring ................ H04J 3/1682
370/442
2009/0013087 A1 1/2009 Lorch et al.
(Continued)

FOREIGN PATENT DOCUMENTS

CN 103379476 A 10/2013
CN 104969529 A 10/2015
(Continued)

OTHER PUBLICATIONS

Extended European Search Report issued in corresponding European Patent Application No. 17196282.2 dated Feb. 15, 2018, 9 pages.
(Continued)

*Primary Examiner* — William Nealon
(74) *Attorney, Agent, or Firm* — Arch & Lake LLP

(57) ABSTRACT

A method, apparatus and computer-readable medium are provided for voice call in mobile communication technologies. The method may include: displaying at least one contact when an instruction for viewing contact information is received, the at least one contact including a plurality of pieces of contact information and a plurality of pieces of network service status, the network service status indicating whether corresponding contact terminal currently supports IMS based voice service; determining, when a selection instruction for selecting target contact information is received, call parameter range supported by a target contact terminal based on target network service status; and transmitting a request for voice call to a core network equipment.

15 Claims, 6 Drawing Sheets

(51) Int. Cl.
*H04L 29/08* (2006.01)
*H04M 1/725* (2006.01)

(52) U.S. Cl.
CPC ............ *H04L 67/141* (2013.01); *H04L 67/24* (2013.01); *H04L 67/36* (2013.01); *H04M 1/2745* (2013.01); *H04M 1/72519* (2013.01)

(58) Field of Classification Search
USPC ........................................................ 370/328
See application file for complete search history.

(56) References Cited

U.S. PATENT DOCUMENTS

| | | | | |
|---|---|---|---|---|
| 2014/0219272 | A1* | 8/2014 | Shuman | H04L 65/1016 370/352 |
| 2016/0359942 | A1* | 12/2016 | Li | H04L 65/80 |
| 2017/0104704 | A1* | 4/2017 | Choi | H04L 51/043 |
| 2018/0255594 | A1* | 9/2018 | Liang | H04W 76/12 |

FOREIGN PATENT DOCUMENTS

| | | |
|---|---|---|
| CN | 106506450 A | 3/2017 |
| WO | 2007080558 A2 | 7/2007 |

OTHER PUBLICATIONS

First Office Action (including English translation) issued in corresponding Chinese Application No. 201610900116.X, dated Oct. 31, 2018, 15 pages.

* cited by examiner

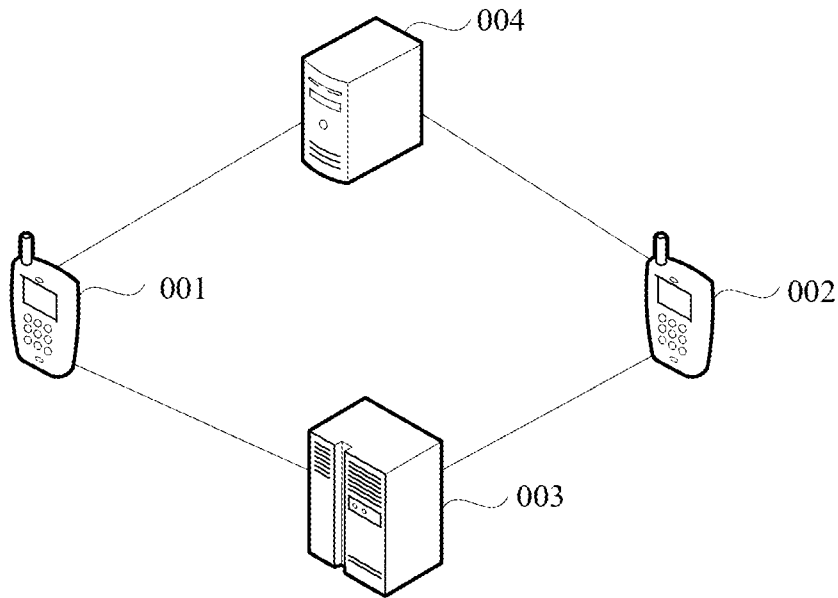

Fig. 1

| displaying a list of contacts when an instruction for viewing contact information is received, the list of contacts including contact information and a corresponding network service status, where the contact information corresponds to the network service status, and the network service status indicating whether corresponding contact terminal currently supports IMS based voice service | 201 |
|---|---|

| determining, when an instruction for selection of target contact information is received, a call parameter range supported by a target contact terminal based on target network service status, the target contact information being any piece of the plurality of pieces of contact information, the target network service status being a network service status corresponding to the target contact information | 202 |
|---|---|

| transmitting a request for voice call to a core network equipment, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter | 203 |
|---|---|

Fig. 2

METHOD, APPARATUS, AND COMPUTER-READABLE MEDIUM FOR VOICE CALL

CROSS-REFERENCE TO RELATED APPLICATION

This application is based on and claims priority to Chinese Patent Application No. 201610900116.X, filed on Oct. 14, 2016, which is incorporated herein by reference in its entirety.

FIELD

The present disclosure generally relates to mobile communication technologies, and more particularly to a method, apparatus and computer-readable medium for voice call.

BACKGROUND

Long-Term Evolution (LTE) is a standard for high-speed wireless communication for mobile devices. With the development of mobile communication technologies, Voice over LTE (VoLTE) is gradually mature. As VoLTE technology is a type of Internet Protocol (IP) data transmission technology, the terminal can realize the voice service based on Internet Protocol Multimedia Subsystem (IMS) through the VoLTE technology. That is, a user terminal can make a voice call with a terminal of a contact via VoLTE technology.

In the related arts, when the user terminal makes a voice call with the terminal of a contact via VoLTE technology, the user terminal needs to select corresponding coding format and code rate for voice encoding by negotiation with a core network equipment according to current network connection condition, and then makes the voice call with the terminal of a contact with the selected coding format and code rate.

SUMMARY

In view of the related arts, a method and apparatus for voice call are provided in the disclosure.

According to a first aspect of the present disclosure, there is provided a method for voice call. The method may include: displaying at least one contact when an instruction for viewing contact information is detected, the at least one contact including contact information and a corresponding network service status, the corresponding network service status indicating whether corresponding contact terminal currently supports network Interconnection Protocol Multimedia Subsystem (IMS) based voice service; determining, when a selection instruction for selecting target contact information is detected, call parameter range supported by a target contact terminal based on target network service status, the target contact information being any piece of the plurality of pieces of contact information, the target network service status being a piece of network service status corresponding to the target contact information; and transmitting a request for voice call to a core network equipment, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter.

According to a second aspect of the present disclosure, there is provided an apparatus for voice call. The apparatus may include: a display module configured to display at least one contact when an instruction for viewing contact information is detected, the at least one contact including contact information and a corresponding network service status, the corresponding network service status indicating whether corresponding contact terminal currently supports network Interconnection Protocol Multimedia Subsystem (IMS) based voice service; a determination module configured to determine, when a selection instruction for selecting target contact information is detected, call parameter range supported by a target contact terminal based on target network service status, the target contact information being any piece of the plurality of pieces of contact information, the target network service status being a piece of network service status corresponding to the target contact information; and a first transmission module configured to transmit a request for voice call to a core network equipment, the request for voice call carrying the target contact information and the call parameter range, the request for voice call being used to instruct the core network equipment to determine a call parameter for a voice call with the target contact terminal based on the call parameter range and to make a voice call with the target contact terminal based on the target contact information and the determined call parameter.

According to a third aspect of the present disclosure, there is provided an apparatus for voice call. The apparatus may include: a processor and a memory to store processor executable instructions. The processor is configured to: display at least one contact when an instruction for viewing contact information is detected, the at least one contact including contact information and a corresponding network service status, the corresponding network service status indicating whether corresponding contact terminal currently supports network Interconnection Protocol Multimedia Subsystem (IMS) based voice service; determine, when a selection instruction for selecting target contact information is detected, call parameter range supported by a target contact terminal based on target network service status, the target contact information being any piece of the plurality of pieces of contact information, the target network service status being a piece of network service status corresponding to the target contact information; and transmit a request for voice call to a core network equipment, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter.

According to a fourth aspect, there is provided a computer-readable medium having instructions thereon that when executed cause a computer to perform acts including: displaying at least one contact when an instruction for viewing contact information is detected, the at least one contact including contact information and a corresponding network service status, the corresponding network service status indicating whether corresponding contact terminal currently supports network Interconnection Protocol Multimedia Subsystem (IMS) based voice service; determining, when a selection instruction for selecting target contact information is detected, call parameter range supported by a target contact terminal based on target network service status, the target contact information being any piece of the plurality of pieces of contact information, the target network service status being a piece of network service status corresponding to the target contact information; and transmitting a request for voice call to a core network equipment, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter.

It is to be understood that both the forgoing general description and the following detailed description are exemplary and illustrative only, and will not limit the present disclosure.

BRIEF DESCRIPTION OF THE DRAWINGS

The accompanying drawings, which are incorporated in and constitute a part of this specification, illustrate aspects consistent with the invention and, together with the description, serve to explain the principles of the invention.

FIG. 1 is a schematic diagram illustrating a system architecture for voice call provided in an aspect of the disclosure.

FIG. 2 is a flow chart illustrating a method for voice call according to an aspect of the disclosure.

DETAILED DESCRIPTION

Figure 3:
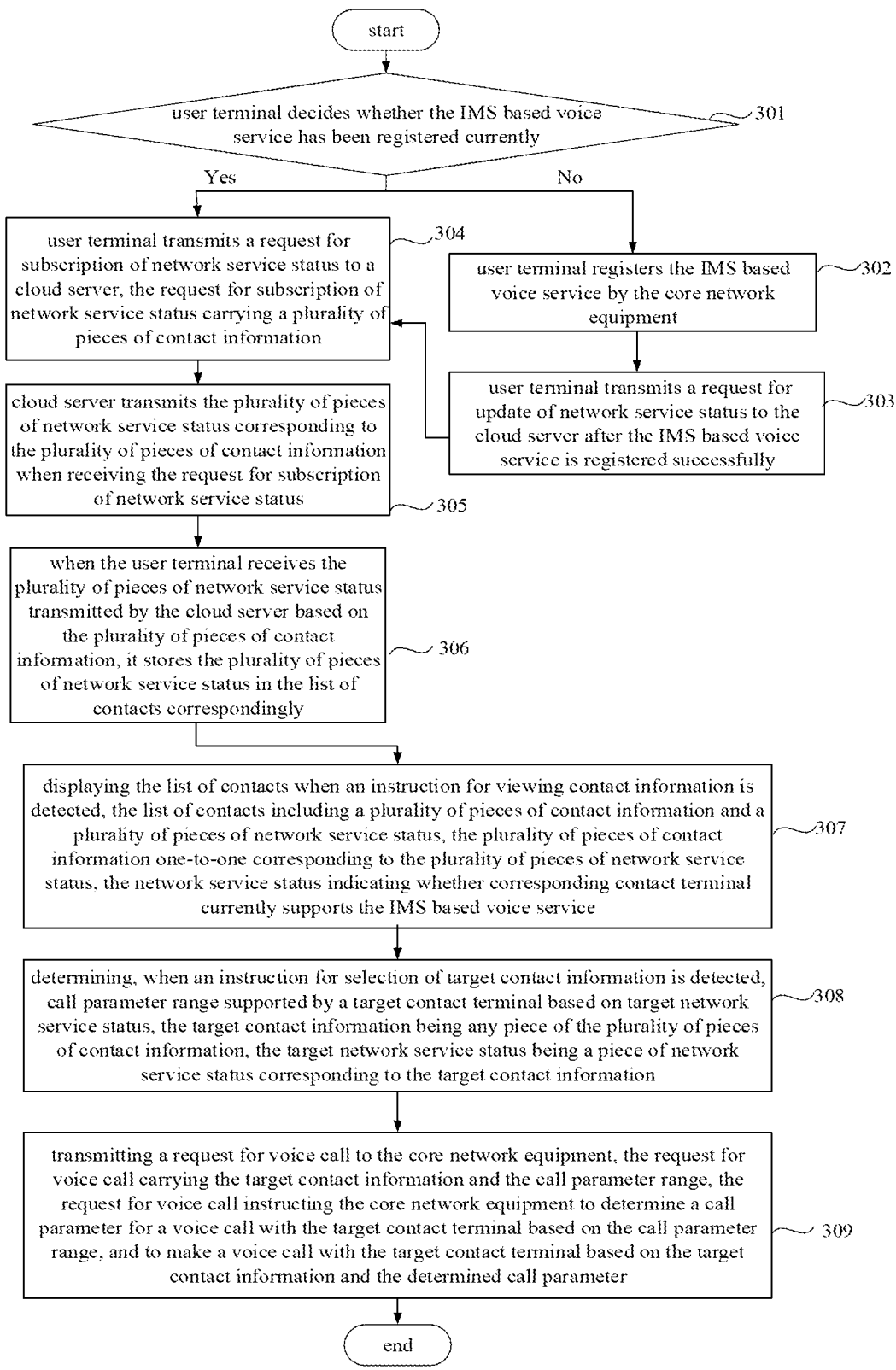
FIG. 3 is a flow chart illustrating a method for voice call according to an aspect of the disclosure.

Exemplary embodiments are described in detail herein, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of apparatuses and methods consistent with aspects related to the invention as recited in the appended claims.

An application scenario of the present disclosure will be introduced prior to describing embodiments of the present disclosure. In related arts, when a first terminal initiates a voice call with a second terminal. If the first terminal uses 2G/3G network rather than IMS based voice service and also employs a voice coding format with low bit rate and low bandwidth such as Adaptive Multi-Rate narrow-band (AMR-NB), the second terminal, which is using IMS voice service, may only receive and transmit compressed voice data with low code rate due to the limit from network and voice encoding of the first terminal. As a result, the effect of the communication may be unsatisfactory. Furthermore, there may be a waste of network resource and unnecessary signaling overhead for network negotiation. The present disclosure provides a method for voice call, which may avoid a waste of network resource due to having a call with IMS voice service when the IMS voice service is not supported by the target contact terminal as well as the resulting unnecessary signaling overhead for network negotiation.

FIG. 1 is a schematic diagram illustrating a system architecture for voice call provided in one or more aspects. Referring to FIG. 1, the system may include a user terminal 001, a contact terminal 002 (which refers to a terminal of a contact person of the user terminal 001 herein), a core network equipment 003, and a cloud server 004. The user terminal 001 and the contact terminal 002 may communicate with the cloud server 004 through a wired network or a wireless network, respectively. The user terminal 001 and the contact terminal 002 may also communicate with the core network equipment 003, respectively. Both of the user terminal 001 and the contact terminal 002 may be used to make a voice call. The core network equipment 003 may be used to receive a request for voice call sent from the user terminal 001 and establish a voice call between the user terminal 001 and the contact terminal 002. The cloud server 004 may be used to store network service status of a plurality of terminals.

Both of the user terminal 001 and the contact terminal 002 may be a calling device such as a mobile phone. The cloud server 004 may be a server or a cluster of servers composed of a plurality of servers. The embodiments are not specifically limited in this respect.

FIG. 2 is a flow chart illustrating a method for voice call according to one or more aspects. As shown in FIG. 2, the method for voice call may be applied in a terminal and includes following steps.

In step 201, a list of contacts is displayed when an instruction for viewing contact information is detected or received. The list of contacts may include at least one contact. The at least one contact may include contact information and a corresponding network service status. For example, when there are multiple contacts in the contact list, the contact list includes a plurality of pieces of contact information (which refers to information about corresponding contact person) and a plurality of pieces of corresponding network service status. The plurality of pieces of contact information may have one-to-one correspondence to the plurality of pieces of network service status. The network service status may indicate whether corresponding contact terminal currently supports the IMS based voice service.

In step 202, when a selection instruction for selecting target contact information is detected or received, a call parameter range supported by a target contact terminal may be determined based on target network service status. The target contact information may be any piece of the plurality of pieces of contact information. The target network service status may be a piece of network service status corresponding to the target contact information. For example, the target network service status may include "supporting IMS" or "not supporting IMS", supported IMS version, or other statuses associated with the target contact information.

In step 203, a request for voice call is transmitted to a core network equipment. The request for voice call may carry the target contact information and the call parameter range. The request for voice call may be used to instruct the core network equipment to determine a call parameter for a voice call with the target contact terminal based on the call parameter range and to make a voice call with the target contact terminal based on the target contact information and the determined call parameter.

In the embodiments of the present disclosure, as the network service status may indicate whether a contact terminal currently supports the IMS based voice service, the list of contacts may display network service status corresponding to a plurality of pieces of contact information. When the user terminal makes a voice call with a target contact, it may transmit a request for voice call to the core network equipment based on the target network service status corresponding to the target contact information. As a result, a waste of network resource due to having a call with IMS voice service when the IMS voice service is not supported by the target contact terminal can be avoided as well as the resulting unnecessary signaling overhead for network negotiation.

Optionally, prior to displaying the at least one contact, the method may further include: transmitting a request for subscription of network service status to a cloud server, the request for subscription of network service status carrying the plurality of pieces of contact information; receiving the plurality of pieces of network service status transmitted by the cloud server based on the plurality of pieces of contact information; and storing the plurality of pieces of network service status in the at least one contact correspondingly.

Optionally, prior to transmitting the request for subscription of network service status to the cloud server, the method may further include: determining whether the IMS based voice service has been registered currently; performing operation of transmitting the request for subscription of network service status to the cloud server if the IMS based voice service has been registered currently.

Optionally, after determining whether the IMS based voice service has been registered currently, the method may further include: registering the IMS based voice service through the core network equipment if the IMS based voice service has not been registered currently; transmitting a request for update of network service status to the cloud server after the IMS based voice service is registered successfully. Here, the request for update of network service status may carry access information of a user terminal. The request for update of network service status is used to instruct the cloud server to update network service status of the user terminal.

Optionally, the method may further include: receiving a network service status change message transmitted by the cloud server, the network service status change message including the target contact information and the changed network service status; and replacing the network service status corresponding to the target contact information in the at least one contact with the changed network service status.

The above optional technical solutions may be combined in any way to form optional embodiments of the present disclosure, which is omitted herein for concision.

FIG. 3 is a flow chart illustrating a method for voice call according to one or more aspects. For ease of illustration, implementation of the method for voice call on a mobile terminal is used as an example to describe the method provided in the embodiments of the present disclosure. As shown in FIG. 3, the method for voice call may include following steps.

In step 301, the user terminal determines whether the IMS based voice service has been registered currently, perform step 302 when the IMS based voice service has not been registered currently, and perform step 304 when the IMS based voice service has been registered currently.

As the user terminal registers the IMS based voice service through the core network equipment, the user terminal may determine whether the IMS based voice service has been registered currently by the core network equipment. Moreover, after the user terminal registers the IMS based voice service through the core network equipment, the cloud server may receive and store information that the user terminal has registered the IMS based voice service, therefore the user terminal may determine whether the IMS based voice service has been registered currently by the cloud server. Of course, the user terminal may also store information about whether the IMS based voice service has been registered currently. Therefore, the user terminal may also determine whether the IMS based voice service has been registered currently based on the stored information. The embodiments are not specifically limited in this respect.

The way that user terminal determines whether the IMS based voice service has been registered currently by the core network equipment may refer to methods of determining whether other services have been registered in the related arts, which is not described in details in the present disclosure.

In the event that the user terminal determines whether the IMS based voice service has been registered currently by the cloud server, the user terminal may transmit a query request to the cloud server. The query request may carry access information of the user terminal. The cloud server may compare the information with that stored in a database of the cloud server after receiving the query request, and transmit the comparison result to the user terminal. Upon the user terminal receives the comparison result, the user terminal may determine that the user terminal has registered the IMS based voice serve currently if the comparison result indicates that there is access information of the user terminal in the database of the cloud server. Additionally or alternatively, the user terminal may determine that the user terminal has not registered the IMS based voice serve currently if the comparison result indicates that there is no access information of the user terminal in the database of the cloud server In the event that the user terminal determines whether the IMS based voice service has been registered currently based on the stored information, the user terminal may look up information related to registering the IMS based voice service in a memory of the user terminal after detecting a look-up instruction. It is determined that the IMS based voice serve has been registered if the information related to registering the IMS based voice service is looked up in a memory of the user terminal. It is determined that the IMS based voice serve has not been registered if the information related to registering the IMS based voice service is not looked up in a memory of the user terminal.

It is appreciated that the look-up instruction may be used to instruct the user terminal to look up the information related to registering the IMS based voice service from information stored by itself. The look-up instruction may also be triggered by a user or the user terminal. If the look-up instruction is triggered by the user, the user may trigger by a preset operation such as click, shake, slide and the like. The embodiments are not specifically limited in this respect.

It is also appreciated that the user terminal may determine whether the IMS based voice service has been registered currently on start-up. Also, the determining may be performed at other time instances such as, when it is idle, re-registering the IMS based voice service and the like. The embodiments are not specifically limited in this respect.

Moreover, in the embodiments of the present disclosure, the IMS based voice service refers to not only IMS based voice call service, but also other voice service related to calls such as IMS based video calls. The embodiments are not specifically limited in this respect.

Further, the IMS based voice call service may include high definition voice call service based on VoLTE technology. The high definition voice call service based on VoLTE technology may employ Adaptive Multi-Rate (AMR) coding format for calls. The AMR coding format is a coding format that determines the voice code rate based on hardware, signal coverage, and network resource conditions. For example, when it is detected that the network is in good condition, the user terminal may select a voice code format with a high code rate to make a call with the contact terminal according to the current network condition. When it is detected that the hardware is restricted or the network coverage is poor or the resource is limited, the user terminal may select a voice code format with a low code rate to make a call with the contact terminal according to the current condition in order to reduce network load.

In step 302, the user terminal registers the IMS based voice service by the core network equipment.

Optionally, after the user terminal determines the IMS based voice service has not been registered currently, the user terminal may transmit a request for subscription to the core network equipment. The request for subscription may carries access information of the user terminal. When the core network equipment receives the request for subscription, it generates corresponding registration information based on the access information of the user terminal carried by the request for subscription, and then completes the registration. The registration information may be stored in the core network equipment, or may be transmitted to the user terminal by the core network equipment and then stored in the user terminal. The embodiments are not specifically limited in this respect.

It is appreciated that in the event of registering the IMS based voice service by the core network equipment, the user terminal may register with the core network equipment only for one type of service, and may also combine various types of service of IMS based voice service such as calls, videos, short messages and the like to register with the core network equipment. The service status of various types of service is independent. The embodiments are not specifically limited in this respect.

It is also appreciated that the user terminal may deregister the IMS based voice service through the core network equipment. The implementation of deregistration may make reference to related arts. The embodiments are not specifically limited in this respect.

In step 303, the user terminal transmits a request for update of network service status to the cloud server after the IMS based voice service is registered successfully. The request for update of network service status may carries access information of a user terminal. The request for update of network service status may be used to instruct the cloud server to update network service status of the user terminal.

The user terminal may transmit a request for update of network service status to the cloud server after the IMS based voice service is registered successfully. The cloud server may determine whether there is the access information of the user terminal in the stored database based on the access information of the user terminal after receiving the request for update of network service status. If there is no access information of the user terminal in the database, the access information of the user terminal and the network service status may be stored correspondingly in the database. If there is access information of the user terminal in the database, the network service status of the user terminal may be stored in the database to correspond to the access information of the user terminal.

The access information of the user terminal may be used to uniquely identify the user terminal. For example, the access information may be a serial number for the user terminal, a telephone number of the user terminal and the like. The embodiments are not specifically limited in this respect.

It is appreciated that after the user terminal registers the IMS based voice service as the above steps and stores the network service status in the cloud server, another terminal may query the network service status of the user terminal from the cloud server, such that may determine whether the user terminal supports the IMS based voice service or not. Of course, The another terminal may also register the IMS based voice service as the above steps and store the network service status in the cloud server.

In addition, in some embodiments, after the user terminal registers the IMS based voice service as the above steps 302 and 303 and stores the network service status of the user terminal in the cloud server, the user terminal may also subscribe network service status of the contacts, that is, the user terminal may perform step 304.

In step 304, the user terminal transmits a request for subscription of network service status to a cloud server, the request for subscription of network service status carrying a plurality of pieces of contact information.

The request for subscription of network service status may be used to request to subscribe network service status of a contact terminal from the cloud server and to push changed network service status to the user terminal by the cloud server after the network service status of the contact terminal changes. The user terminal may subscribe either the network service status corresponding to all pieces of the stored contact information or the network service status corresponding to part of the contact information. That is, the plurality of pieces of contact information carried in the request for subscription of network service status may include not only all of the stored contact information but also part of the contact information.

It is appreciated that when the plurality of pieces of contact information carried in the request for subscription of network service status include part of the contact information, the part of the contact information may be selected from the at least one contact by the user, or may also be selected as those with a contact frequency higher than a frequency threshold from the at least one contact by the user terminal. The frequency threshold may be preset in advance such as 0.8, 0.85, and the like. The embodiments are not specifically limited in this respect.

Furthermore, the contact information may be information that may uniquely identify the contact terminal such as the telephone number of the contact. The embodiments are not specifically limited in this respect.

In step 305, the cloud server transmits the plurality of pieces of network service status corresponding to the plurality of pieces of contact information when receiving the request for subscription of network service status.

When the cloud server receives the request for subscription of network service status, it may look up the corresponding plurality of pieces of network service status from the database based on the plurality of pieces of contact information, and transmit the plurality of pieces of network service status looked up to the user terminal.

In step 306, when the user terminal receives the plurality of pieces of network service status transmitted by the cloud server based on the plurality of pieces of contact information, it stores the plurality of pieces of network service status in the at least one contact correspondingly.

When the user terminal receives the plurality of pieces of network service status transmitted by the cloud server based on the plurality of pieces of contact information, it stores the plurality of pieces of network service status in the at least one contact correspondingly, as the plurality of pieces of network service status one-to-one correspond to the plurality of pieces of contact information.

The user terminal may store the received plurality of pieces of network service status in the at least one contact in one-to-one correspondence, such that each network service status corresponding to each contact may be displayed in the list of contacts before making the call, and in turn the user may know the network service status of each contact quickly.

Further, as the network service status corresponding to respective contact information stored in the cloud server may change, the cloud server may transmit a network service status change message to the user terminal when the network service status corresponding to the target contact information changes. The network service status change message may include the target contact information and the changed network service status. The target contact information may be any piece of the plurality of pieces of contact information. The user terminal may replace the network service status corresponding to the target contact information in the at least one contact with the changed network service status after receiving the network service status change message transmitted by the cloud server.

The implementation of the user terminal replacing the network service status corresponding to the target contact information in the at least one contact with the changed network service status may be as follows: deleting the network service status corresponding to the target contact information in the at least one contact, and storing the changed network service status in the at least one contact correspondingly.

In steps 301-306, the user terminal may synchronize the network service status of the contact terminal in real time by transmitting the request for subscription of network service status to the cloud server and receiving the network service status change message transmitted by the cloud server. After acquiring the network service status of the contact terminal, the user terminal may make a voice call with the contact terminal by steps 307-309.

In step 307, the at least one contact is displayed when an instruction for viewing contact information is detected. The at least one contact may include a plurality of pieces of contact information and a plurality of pieces of network service status. The plurality of pieces of contact information one-to-one correspond to the plurality of pieces of network service status. The network service status may indicate whether corresponding contact terminal currently supports the IMS based voice service.

As the plurality of pieces of contact information one-to-one correspond to the plurality of pieces of network service status, the plurality of pieces of network service status may be displayed in front of or behind the plurality of pieces of contact information in one-to-one correspondence. The embodiments are not specifically limited in this respect.

It is appreciated that instruction for viewing contact information is used to view the contact information, and the instruction for viewing contact information may be triggered by the user performing a preset operation. The embodiments are not specifically limited in this respect.

Further, in the embodiments, the plurality of pieces of network service status may be displayed in the at least one contact as options. Alternatively, for each piece of the plurality of pieces of network service status, it may be displayed in a detail interface for the corresponding contact information. The embodiments are not specifically limited in this respect.

In step 308, when a selection instruction for selecting a target contact is detected, a call parameter range supported by a target contact terminal is determined based on target network service status. The target contact may be any contact in the list of contacts. The target contact information may be any piece of the plurality of pieces of contact information corresponding to the target contact. The target network service status may be a piece of network service status corresponding to the target contact information.

When the user terminal detects the selection instruction for selecting a target contact, the user terminal determines the target contact information. Further, the user terminal may determine the call parameter range supported by the target contact terminal under the target network service status. The call parameter may include, for example, voice bandwidth, voice code rate, and the like. For example, when the target network service status corresponding to the target contact information indicates the target contact terminal has registered the IMS based voice service, the range of parameters such as voice bandwidth, voice code rate, and the like corresponding to the IMS based voice service supported by the target contact terminal may be determined based on the target network service status It is appreciated that the instruction for selection may be used to select the target contact information from the at least one contact, and the instruction for selection may be triggered by the user performing a preset operation. The embodiments are not specifically limited in this respect.

Moreover, the target contact terminal is a terminal of a target contact and corresponds to the target contact information.

In step 309, a request for voice call is transmitted to the core network equipment. The request for voice call may carry the target contact information and the call parameter range. The request for voice call may instruct the core network equipment to determine a call parameter for a voice call with the target contact terminal based on the call parameter range, and to make a voice call with the target contact terminal based on the target contact information and the determined call parameter.

After the selection instruction for selecting target contact is detected and the user is determined to need a voice call with the target contact, the user terminal may transmit the request for voice call to the core network equipment. The request for voice call may carry not only the target contact information but also the call parameter range supported by the target contact terminal, thus the core network equipment, after receiving the request for voice call, may select a suitable call parameter from the call parameter range supported by the target contact terminal carried in the request for voice call to negotiate with the user terminal and the target contact terminal, and determine a final call parameter used to make a voice call between the user terminal and the target contact terminal. Thereafter, the core network equipment may implement the voice call between the user terminal and the target contact terminal based on the target contact information and the determined call parameter. Compared with the existing art where the core network equipment blindly selects the call parameter several times and negotiates with the user terminal and the target contact terminal without knowledge about the network service status of the target contact, in present disclosure, the core network equipment may select the call parameter based on the call parameter range supported by the target contact terminal and then negotiate with the user terminal and the target contact terminal. As a result, in the present disclosure, the number of negotiation of the core network equipment with the user terminal may be reduced as well as the signaling overhead of the network negotiation.

When the core network equipment determines the call parameter for the voice call between the user terminal and the target contact terminal based on the call parameter range supported by the target contact terminal, the core network equipment may randomly select any call parameter within the call parameter range to negotiate with the user terminal and the target contact terminal. Also, the core network equipment may select the call parameter with the highest call quality within the call parameter range to negotiate with the user terminal and the target contact terminal. Of course, other selection strategies may be used to select the call parameter within the call parameter range to negotiate with the user terminal and the contact terminal. The embodiments are not specifically limited in this respect. If the core network equipment selects the call parameter with the highest call quality within the call parameter range to negotiate with the user terminal and the target contact terminal, upon successful negotiation, the call parameter with the highest call quality may be determined as the call parameter for the call between the user terminal and the target contact terminal.

In the embodiments of the present disclosure, as the network service status may indicate whether a contact terminal currently supports IMS based voice service, the at least one contact may display network service status corresponding to a plurality of pieces of contact information. When the user terminal makes a voice call with a target contact, it may transmit a request for voice call to the core network equipment based on the target network service status corresponding to the target contact information. As a result, a waste of network resource, due to making a call with IMS voice service when the IMS voice service is not supported by the target contact terminal, can be avoided as well as the resulting unnecessary signaling overhead for network negotiation. Meanwhile, the user terminal may synchronize the network service status of the contact in real time by transmitting the request for subscription of network service status to the cloud server and receiving the network service status change message transmitted by the cloud server, such that the accuracy of the network service status of the contacts locally stored in the user terminal can be guaranteed.

Figure 4A:
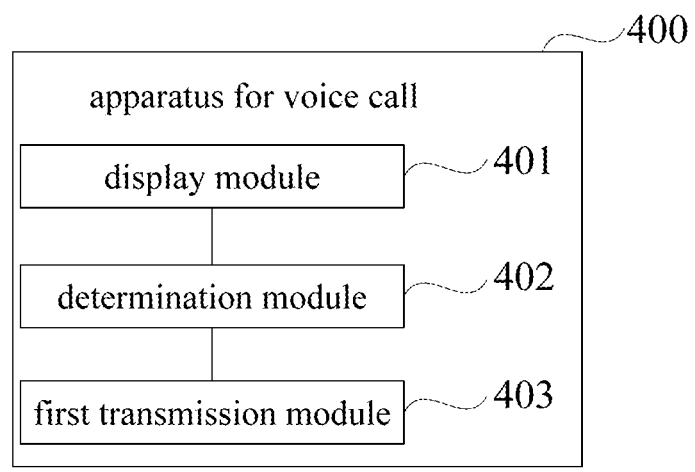
FIG. 4A is a diagram illustrating an apparatus for voice call according to an aspect of the disclosure.

FIG. 4A is a diagram illustrating an apparatus 400 for voice call according to one or more aspects. Referring to FIG. 4A, the apparatus 400 may include a display module 401, a determination module 402, and a first transmission module 403.

The display module 401 may be configured to display at least one contact when an instruction for viewing contact information is detected. The at least one contact may include a plurality of pieces of contact information and a plurality of pieces of network service status. The plurality of pieces of contact information may one-to-one correspond to the plurality of pieces of network service status. The network service status may indicate whether corresponding contact terminal currently supports network Interconnection Protocol Multimedia Subsystem (IMS) based voice service;

The determination module 402 may be configured to determine, when a selection instruction for selecting target contact information is detected, call parameter range supported by a target contact terminal based on target network service status. The target contact information may be any piece of the plurality of pieces of contact information. The target network service status may be a piece of network service status corresponding to the target contact information.

The first transmission module 403 may be configured to transmit a request for voice call to a core network equipment. The request for voice call may carry the target contact information and the call parameter range. The request for voice call may be used to instruct the core network equipment to determine a call parameter for a voice call with the target contact terminal based on the call parameter range and to make a voice call with the target contact terminal based on the target contact information and the determined call parameter.

Figure 4B:
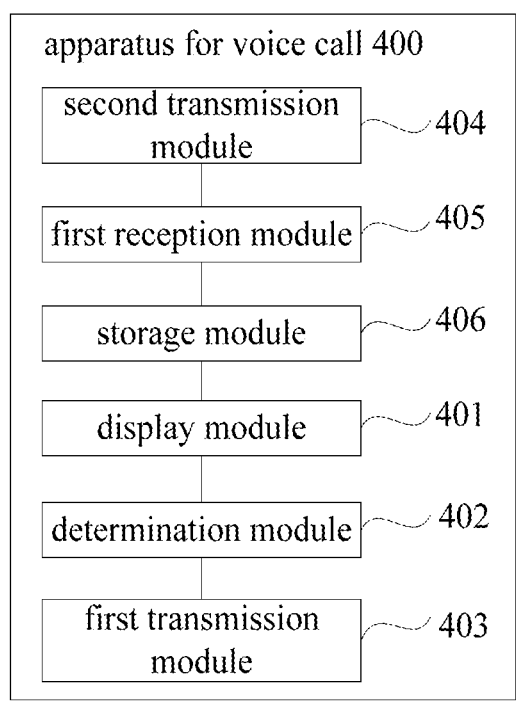
FIG. 4B is a diagram illustrating an apparatus for voice call according to an aspect of the disclosure.

Optionally, referring to FIG. 4B, the apparatus for voice call may further include: a second transmission module 404 configured to transmit a request for subscription of network service status to a cloud server, the request for subscription of network service status carrying the plurality of pieces of contact information; a first reception module 405 configured to receive the plurality of pieces of network service status transmitted by the cloud server based on the plurality of pieces of contact information; and a storage module 406 configured to store the plurality of pieces of network service status in the at least one contact correspondingly.

Figure 4C:
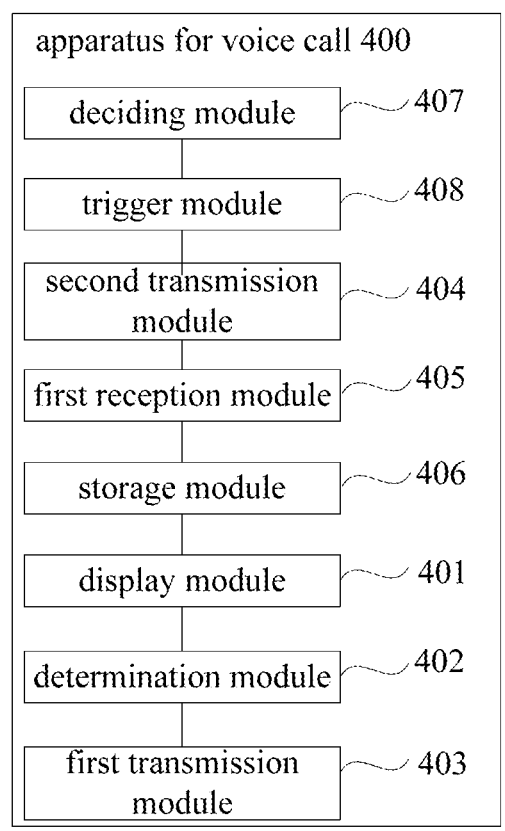
FIG. 4C is a diagram illustrating an apparatus for voice call according to an aspect of the disclosure.

Optionally, referring to FIG. 4C, the apparatus for voice call may further include: a determining module 407 configured to determine whether the IMS based voice service has been registered currently; a trigger module 408 configured to trigger the second transmission module 404 to transmit the request for subscription of network service status to the cloud server if the IMS based voice service has been registered currently.

Figure 4D:
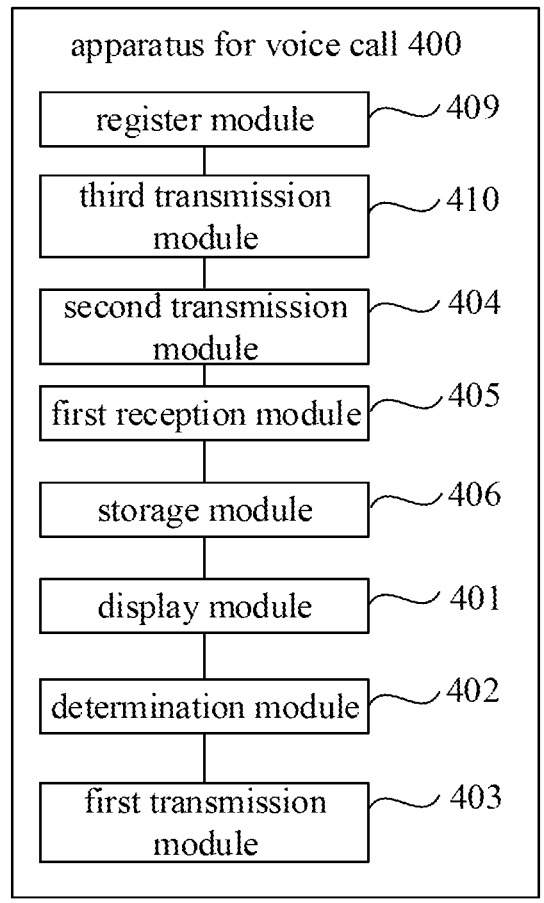
FIG. 4D is a diagram illustrating an apparatus for voice call according to an aspect of the disclosure.

Optionally, referring to FIG. 4D, the apparatus for voice call may further include: a registration module 409 configured to register the IMS based voice service through the core network equipment if the IMS based voice service has not been registered currently; a third transmission module 410 configured to transmit a request for update of network service status to the cloud server after the IMS based voice service is registered successfully, the request for update of network service status carrying access information of a user terminal, the request for update of network service status being used to instruct the cloud server to update network service status of the user terminal.

Figure 4E:
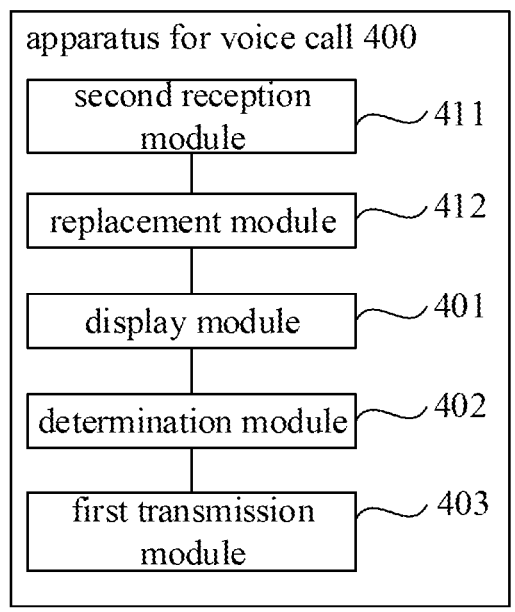
FIG. 4E is a diagram illustrating an apparatus for voice call according to an aspect of the disclosure.

Optionally, referring to FIG. 4E, the apparatus for voice call may further include: a second reception module 411 configured to receive a network service status change message transmitted by the cloud server, the network service status change message including the target contact information and the changed network service status; and a replacement module 412 configured to replace the network service status corresponding to the target contact information in the at least one contact with the changed network service status.

In the embodiments of the present disclosure, as the network service status may indicate whether a contact terminal currently supports IMS based voice service, the at least one contact may display network service status corresponding to a plurality of pieces of contact information. When the user terminal makes a voice call with a target contact, it may transmit a request for voice call to the core network equipment based on the target network service status corresponding to the target contact information. As a result, a waste of network resource, due to making a call with IMS voice service when the IMS voice service is not supported by the target contact terminal, can be avoided as well as the resulting unnecessary signaling overhead for network negotiation. Meanwhile, the user terminal may synchronize the network service status of the contact in real time by transmitting the request for subscription of network service status to the cloud server and receiving the network service status change message transmitted by the cloud server, such that the accuracy of the network service status of the contacts locally stored in the user terminal can be guaranteed.

For the apparatuses in the above embodiments, specific operations performed by each module have been detailed in related method embodiments, and thus detailed description will be omitted here.

Figure 5:
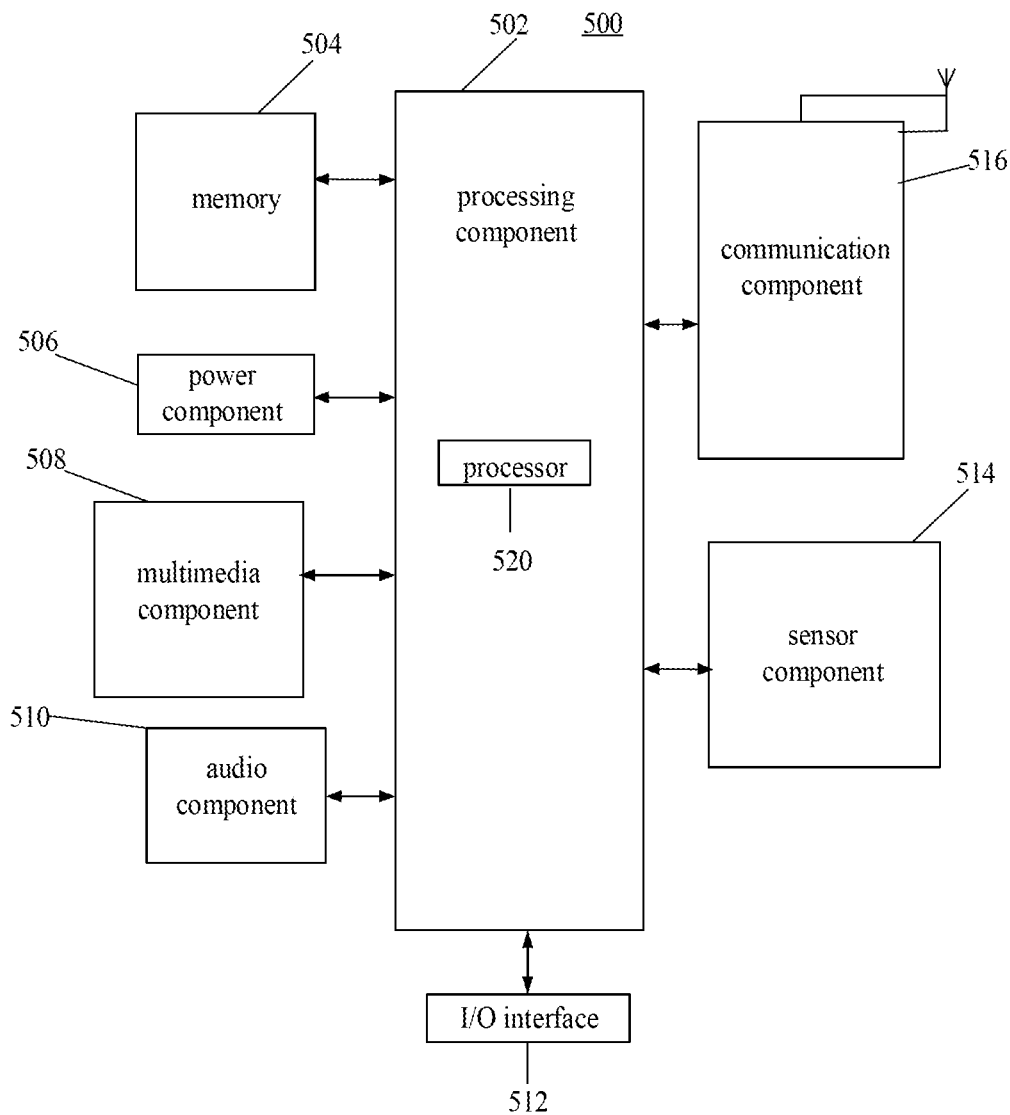
FIG. 5 is a diagram illustrating an apparatus for voice call according to an aspect of the disclosure.

FIG. 5 is a diagram illustrating an apparatus 500 for voice call according to one or more aspects. For example, the apparatus 500 may be a mobile phone, a computer, a digital broadcast terminal, a messaging device, a gaming console, a tablet, a medical device, exercise equipment, a personal digital assistant, and the like.

Referring to FIG. 5, the apparatus 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the apparatus 500. Examples of such data include instructions for any applications or methods operated on the apparatus 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power for the apparatus 500.

The multimedia component 508 includes a screen providing an output interface between the apparatus 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the apparatus 500 is in an operation mode, such as a photographing mode or a video mode. Each of the front camera and the rear camera may be a fixed optical lens system or have optical focusing and zooming capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, the peripheral interface modules being, for example, a keyboard, a click wheel, buttons, and the like. The buttons may include, but are not limited to, a home button, a volume button, a starting button, and a locking button.

The sensor component 514 includes one or more sensors to provide status assessments of various aspects of the apparatus 500. For instance, the sensor component 514 may detect an open/closed status of the apparatus 500, relative positioning of components (e.g., the display and the keypad, of the apparatus 500), a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 may include a proximity sensor configured to detect the presence of a nearby object without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G or 3G or a combination thereof. In one or more exemplary embodiments, the communication component 516 receives a broadcast signal or broadcast associated information from an external broadcast management system via a broadcast channel. In some embodiments, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 may be implemented with one or more circuitry, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 500 may use the circuitry in combination with the other hardware or software components for performing the above described methods. Each module, submodule, unit, or sub-unit disclosed above may be implemented at least partially using the one or more circuitries.

In exemplary embodiments, there is also provided a non-transitory computer-readable storage medium including instructions, such as the memory 504 including instructions, executable by the processor 520 in the apparatus 500, for performing the above-described methods. For example, the non-transitory computer-readable storage medium may be a ROM, a Random Access Memory (RAM), a CD-ROM, a magnetic tape, a floppy disc, an optical data storage device, and the like.

In the examplary embodiments, a non-transient computer readable storage media having instructions therein is provided, which when executed by a processor of the mobile terminal cause the mobile terminal to perform the above method for voice call. The method includes: displaying at least one contact when an instruction for viewing contact information is detected, the at least one contact including a plurality of pieces of contact information and a plurality of pieces of network service status, the plurality of pieces of contact information one-to-one corresponding to the plurality of pieces of network service status, and the network service status indicating whether corresponding contact terminal currently supports network Interconnection Protocol Multimedia Subsystem (IMS) based voice service; determining, when a selection instruction for selecting target contact information is detected, call parameter range supported by a target contact terminal based on target network service status, the target contact information being any piece of the plurality of pieces of contact information, the target network service status being a piece of network service status corresponding to the target contact information; and transmitting a request for voice call to a core network equipment, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter.

Optionally, prior to displaying the at least one contact, the method further includes: transmitting a request for subscription of network service status to a cloud server, the request for subscription of network service status carrying the plurality of pieces of contact information; receiving the plurality of pieces of network service status transmitted by the cloud server based on the plurality of pieces of contact information; and storing the plurality of pieces of network service status in the at least one contact correspondingly.

Optionally, prior to transmitting the request for subscription of network service status to the cloud server, the method further includes: determining whether the IMS based voice service has been registered currently; performing operation of transmitting the request for subscription of network service status to the cloud server if the IMS based voice service has been registered currently.

Optionally, after determining whether the IMS based voice service has been registered currently, the method further includes: registering the IMS based voice service through the core network equipment if the IMS based voice service has not been registered currently; transmitting a request for update of network service status to the cloud server after the IMS based voice service is registered successfully, the request for update of network service status carrying access information of a user terminal, the request for update of network service status being used to instruct the cloud server to update network service status of the user terminal.

Optionally, the method further includes: receiving a network service status change message transmitted by the cloud server, the network service status change message including the target contact information and the changed network service status; and replacing the network service status corresponding to the target contact information in the at least one contact with the changed network service status.

In the embodiments of the present disclosure, as the network service status may indicate whether a contact terminal currently supports the IMS based voice service, the at least one contact may display network service status corresponding to a plurality of pieces of contact information. When the user terminal makes a voice call with a target contact, it may transmit a request for voice call to the core network equipment based on the target network service status corresponding to the target contact information. As a result, a waste of network resource due to having a call with IMS voice service when the IMS voice service is not supported by the target contact terminal can be avoided as well as the resulting unnecessary signaling overhead for network negotiation.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for voice call performed by a terminal, comprising:
    displaying at least one contact when an instruction for viewing contact information is received, the at least one contact including contact information and a corresponding network service status, the corresponding network service status indicating whether corresponding contact terminal currently supports network Interconnection Protocol Multimedia Subsystem (IMS) based voice service, wherein the IMS based voice service is registered through a core network equipment to transmit access information from the terminal to a cloud server so that the access information can be queried from the cloud server by the terminal;
    determining by the terminal, when receiving a selection instruction for selecting a target contact from the at least one contact, a call parameter range supported by a target contact terminal of the target contact based on a target network service status, the target network service status corresponding to target contact information of the target contact, wherein the call parameter range corresponds to the IMS based voice service supported by the target contact terminal; and
    transmitting a request for voice call to the core network equipment by the terminal, the request carrying the target contact information and the call parameter range, the request being used to instruct the core network equipment to determine a call parameter for a voice call with the target contact terminal based on the call parameter range, and to make a voice call with the target contact terminal based on the target contact information and the determined call parameter.

2. The method of claim 1, wherein prior to displaying the at least one contact, the method further comprises:
    transmitting a request for subscription of network service status to a cloud server, the request for subscription of network service status carrying the contact information;
    receiving the corresponding network service status transmitted by the cloud server based on the contact information; and
    storing the network service status in the at least one contact correspondingly.

3. The method of claim 2, wherein prior to transmitting the request for subscription of network service status to the cloud server, the method further comprises:
    determining whether the IMS based voice service has been registered currently; and
    transmitting the request for subscription of network service status to the cloud server if the IMS based voice service has been registered currently.

4. The method of claim 3, wherein after determining whether the IMS based voice service has been registered currently, the method further comprises:
    registering the IMS based voice service through the core network equipment if the IMS based voice service has not been registered currently;
    transmitting a request for update of network service status to the cloud server after the IMS based voice service is registered successfully, the request for update of network service status carrying the access information of a user terminal, the request for update of network service status being used to instruct the cloud server to update network service status of the user terminal.

5. The method of claim 1, wherein the method further comprises:
    receiving a network service status change message transmitted by a cloud server, the network service status change message including the target contact information and a changed network service status; and
    replacing the network service status corresponding to the target contact information in the at least one contact with the changed network service status.

6. An apparatus for voice call, the apparatus being applied in a terminal and the apparatus comprising:
    a processor;
    a memory to store processor-executable instructions;
    wherein the processor is configured to perform acts comprising:
    displaying at least one contact when an instruction for viewing contact information is received, the at least one contact including contact information and a corresponding network service status, the corresponding network service status indicating whether corresponding contact terminal currently supports network Interconnection Protocol Multimedia Subsystem (IMS) based voice service, wherein the IMS based voice service is registered through a core network equipment to transmit access information from the terminal to a cloud server so that the access information can be queried from the cloud server by the terminal;
    determining by a terminal, when a selection instruction for selecting a target contact is received, a call parameter range supported by a target contact terminal based on target network service status, the target network service status corresponding to target contact information of the target contact, wherein the call parameter range corresponds to the IMS based voice service supported by the target contact terminal; and
    transmitting a request for voice call to the core network equipment by the terminal, the request carrying the target contact information and the call parameter range, the request being used to instruct the core network equipment to determine a call parameter for a voice call with the target contact terminal based on the call parameter range and to make a voice call with the target contact terminal based on the target contact information and the determined call parameter.

7. The apparatus of claim 6, wherein the acts further comprise:
    transmitting a request for subscription of network service status to a cloud server, the request for subscription of network service status carrying a plurality of pieces of contact information;
    receiving a plurality of pieces of network service status transmitted by the cloud server based on the plurality of pieces of contact information; and
    storing the plurality of pieces of network service status in the corresponding contact.

8. The apparatus of claim 7, wherein the acts further comprise:
    determining whether the IMS based voice service has been registered currently; and triggering to transmit the request for subscription of network service status to the cloud server if the IMS based voice service has been registered currently.

9. The apparatus of claim 8, wherein the acts further comprise:
registering the IMS based voice service through the core network equipment if the IMS based voice service has not been registered currently; and
transmitting a request for update of network service status to the cloud server after the IMS based voice service is registered successfully, the request for update of network service status carrying the access information of a user terminal, the request for update of network service status being used to instruct the cloud server to update network service status of the user terminal.

10. The apparatus of claim 6, wherein the acts further comprise:
receiving a network service status change message transmitted by a cloud server, the network service status change message including the target contact information and a changed network service status; and
replacing the network service status corresponding to the target contact information in the at least one contact with the changed network service status.

11. A non-transitory computer-readable medium having instructions thereon that when executed cause a computer of a terminal to perform acts comprising:
displaying at least one contact when an instruction for viewing contact information is received, the at least one contact including contact information and a corresponding network service status, the corresponding network service status indicating whether corresponding contact terminal currently supports network Interconnection Protocol Multimedia Subsystem (IMS) based voice service, wherein the IMS based voice service is registered through a core network equipment to transmit access information from the terminal to a cloud server so that the access information can be queried from the cloud server by the terminal;
determining by a terminal, when receiving a selection instruction for selecting a target contact from the at least one contact, a call parameter range supported by a target contact terminal based on target network service status, the target network service status being a piece of network service status corresponding to target contact information of the target contact, wherein the call parameter range corresponds to the IMS based voice service supported by the target contact terminal; and
transmitting a request for voice call to the core network equipment by the terminal, the request for voice call carrying the target contact information and the call parameter range, the request for voice call being used to instruct the core network equipment to determine a call parameter for a voice call with the target contact terminal based on the call parameter range, and to make a voice call with the target contact terminal based on the target contact information and the determined call parameter.

12. The non-transitory computer-readable medium of claim 11, wherein prior to displaying the at least one contact, the acts further comprise:
transmitting a request for subscription of network service status to a cloud server, the request for subscription of network service status carrying a plurality of pieces of contact information;
receiving a plurality of pieces of network service status transmitted by the cloud server based on the plurality of pieces of contact information; and
storing the plurality of pieces of network service status in the at least one contact correspondingly.

13. The non-transitory computer-readable medium of claim 12, wherein prior to transmitting the request for subscription of network service status to the cloud server, the acts further comprise:
determining whether the IMS based voice service has been registered currently; and
transmitting the request for subscription of network service status to the cloud server if the IMS based voice service has been registered currently.

14. The non-transitory computer-readable medium of claim 13, wherein after determining whether the IMS based voice service has been registered currently, the acts further comprise:
registering the IMS based voice service through the core network equipment if the IMS based voice service has not been registered currently;
transmitting a request for update of network service status to the cloud server after the IMS based voice service is registered successfully, the request for update of network service status carrying the access information of a user terminal, the request for update of network service status being used to instruct the cloud server to update network service status of the user terminal.

15. The non-transitory computer-readable medium of claim 11, wherein the acts further comprise:
receiving a network service status change message transmitted by a cloud server, the network service status change message including the target contact information and a changed network service status; and
replacing the network service status corresponding to the target contact information in the at least one contact with the changed network service status.

* * * * *